US009953447B2

(12) United States Patent
Zhu et al.

(10) Patent No.: US 9,953,447 B2
(45) Date of Patent: Apr. 24, 2018

(54) MAKING A COMPUTER DISPLAY MORE EXPRESSIVE

(71) Applicant: Motorola Mobility LLC, Libertyville, IL (US)

(72) Inventors: Xiaofeng Zhu, Nanjing (CN); Lian-Sheng Zhang, Nanjing (CN)

(73) Assignee: Motorola Mobility LLC, Libertyville, IL (US)

( * ) Notice: Subject to any disclaimer, the term of this patent is extended or adjusted under 35 U.S.C. 154(b) by 242 days.

(21) Appl. No.: 14/764,971

(22) PCT Filed: Jan. 31, 2013

(86) PCT No.: PCT/CN2013/071207
§ 371 (c)(1),
(2) Date: Jul. 30, 2015

(87) PCT Pub. No.: WO2014/117365
PCT Pub. Date: Aug. 7, 2014

(65) Prior Publication Data
US 2015/0363958 A1    Dec. 17, 2015

(51) Int. Cl.
*G06F 3/00* (2006.01)
*G06T 11/60* (2006.01)
(Continued)

(52) U.S. Cl.
CPC ............ *G06T 11/60* (2013.01); *G06F 3/0482* (2013.01); *G06F 3/0486* (2013.01); *G06F 3/04812* (2013.01); *G06F 3/04817* (2013.01); *G06F 3/04842* (2013.01); *G06F 9/4443* (2013.01); *G06F 2203/04803* (2013.01); *G06T 2200/24* (2013.01)

(58) Field of Classification Search
CPC . G06F 3/04817; G06F 3/04842; G06F 3/0486
See application file for complete search history.

(56) References Cited

U.S. PATENT DOCUMENTS 8,359,541 B1 * 1/2013 Landry ................. G06F 3/0481
345/620
8,499,258 B1 * 7/2013 Cho ..................... G06F 3/04883
715/773
(Continued)

FOREIGN PATENT DOCUMENTS

| CN | 101345003 | 1/2009 |
| CN | 101739127 | 6/2010 |
| CN | 102118505 | 7/2011 |

*Primary Examiner* — Omar Abdul-Ali
(74) *Attorney, Agent, or Firm* — McDermott Will & Emery LLP

(57) ABSTRACT

According to aspects of the present disclosure, certain areas of the display screen are logically considered to be "privileged." For example, a user may run a utility program and selected areas of the wallpaper to be privileged. In another example, a utility scans the wallpaper looking for, say, a face or text and marks the location around the face or text as privileged. In any case, when an icon (or other visual information) needs to be placed on the display screen, the icon is preferentially placed at a location that does not overlap with the privileged areas. If no non-privileged area is available, then an alert can be sent to the user.

23 Claims, 7 Drawing Sheets

(51) Int. Cl.
*G06F 3/0486* (2013.01)
*G06F 3/0481* (2013.01)
*G06F 3/0484* (2013.01)
*G06F 3/0482* (2013.01)
*G06F 9/44* (2018.01)

(56) References Cited

U.S. PATENT DOCUMENTS

2008/0094421 A1    4/2008   Maeda
2011/0148917 A1    6/2011   Alberth, Jr. et al.

* cited by examiner

300  Receive a command to place an icon on the display screen.

302  Compare a proposed location for the icon on the display screen with a privileged area of the display screen.

304  If the proposed area overlaps with a privileged area, then place the icon at a location on the display screen that does not overlap with the privileged area (if this is possible).

306  If no area is found for the icon that does not overlap with a privileged area, then place the icon at the proposed location and alert the user.

FIG. 3

MAKING A COMPUTER DISPLAY MORE EXPRESSIVE

TECHNICAL FIELD

The present disclosure is related generally to computer operating systems and, more particularly, to displaying formation on a computer screen.

BACKGROUND

Computing systems often portray a background image on their display screens. These background images are usually static to prevent them from distracting the users of the computing systems. However, if the computing system has not been used for a while, dies the static image is sometimes replaced with an active one (sometimes called a "screen saver" for historical reasons).

Whenever the computing system wishes to present to its user some visual information (e.g., a system message, application or folder icons, a status bar, or an application window), the visual information is written over, that is, it obscures an area of the background image. In some implementations, the overwriting is done semi-transparently so that the underlying image can still be made out.

A user of a personal computing device often chooses a background image that is somehow meaningful to that user. For example, the user may choose for a background an interesting geometric pattern or a photograph of, say, his family.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

FIG. 3 is a flowchart of a representative method for avoiding placing an icon on a privileged area of a display screen;

DETAILED DESCRIPTION

Figure 1A:
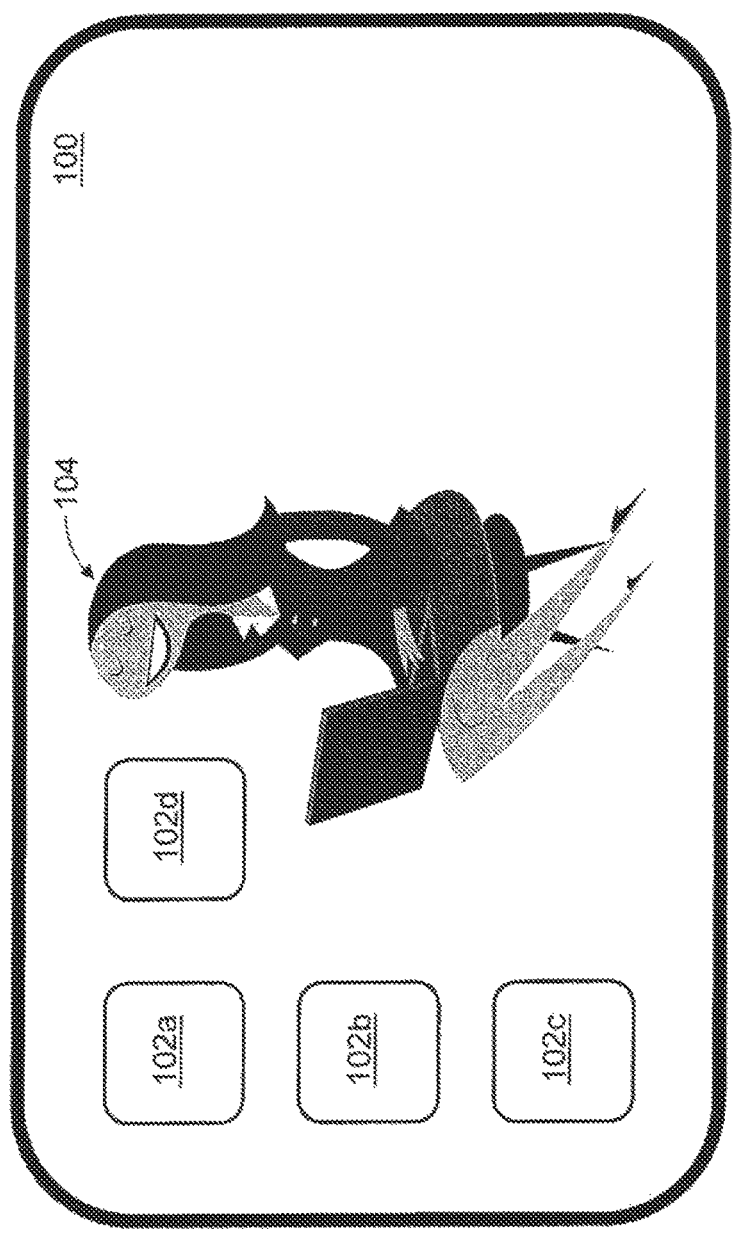
FIGS. 1a, 1b, and 1c are screenshots of a display screen operated according to aspects of the present disclosure.

Turning to the drawings, wherein like reference numerals refer to like elements, techniques of the present disclosure are illustrated as being implemented in a suitable environment. The following description is based on embodiments of the claims and should not be taken as limiting the claims with regard to alternative embodiments that are not explicitly described herein.

Traditionally, when a computing system needs to place a new icon on a display screen, it places the new icon at the next unused space defined by an imaginary two-dimensional rectangular grid on the display screen. If, as is becoming more common, the background image on the display screen (herein called the "wallpaper" for ease of discussion) is somehow meaningful to the user, then the new icon may be placed at a location where it obscures an especially meaningful part of the wallpaper. If, for example, the wallpaper includes a photograph of a person of note to the user, then the icon may be unfortunately placed so that it obscures that person's face.

According to aspects of the present disclosure, certain areas of the display screen are logically considered to be "privileged." For example, a user may run a utility program and selected areas of the wallpaper to be privileged. In another example, a utility scans the wallpaper looking for, say, a face or text and marks the location around the face or text as privileged. In any case, when an icon (or other visual information) needs so be placed on the display screen, the icon is preferentially placed at a location that does not overlap with the privileged areas. If no non-privileged area is available, then an alert can be sent to the user.

To illustrate these ideas, please consider FIG. 1a. The user of the electronic device 100 has decided to portray as wallpaper 104 a picture of someone meaningful to him. While wallpaper 104 typically covers the entire surface of the display screen, in FIG. 1a only the center portion of the wallpaper 104 is especially meaningful to the user.

In addition to the wallpaper 104, the display screen of the electronic device 100 also shows a series of icons 102a through 102d. These icons 102a-d represent any type of visual information and can include, for example, icons for folders, buttons to bring up menus or specific applications, displays from utility programs (such as a clock), status icons from the operating system (e.g., an amount of battery power remaining), and the like.

Figure 1B:
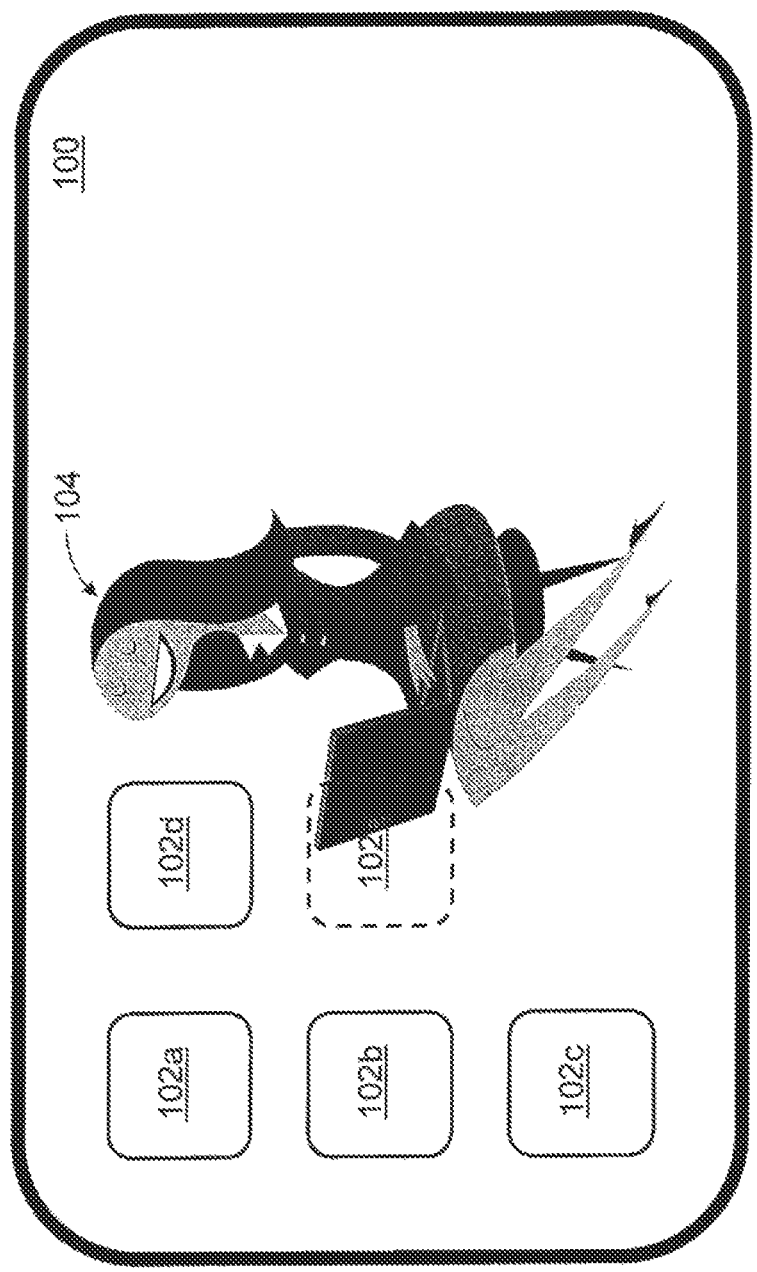

Now turn to FIG. 1b. In this figure, a new icon 102e needs to be displayed. Traditionally, the new icon 102e would be placed at the first unused space defined by a grid logically placed on the display screen, often a two-dimensional rectangular grid. FIG. 1b shows the new icon 102e placed at this first unused space. Unfortunately, that space overlaps with a portion of the wallpaper 104 that is meaningful to the user of the electronic device 100.

Figure 1C:
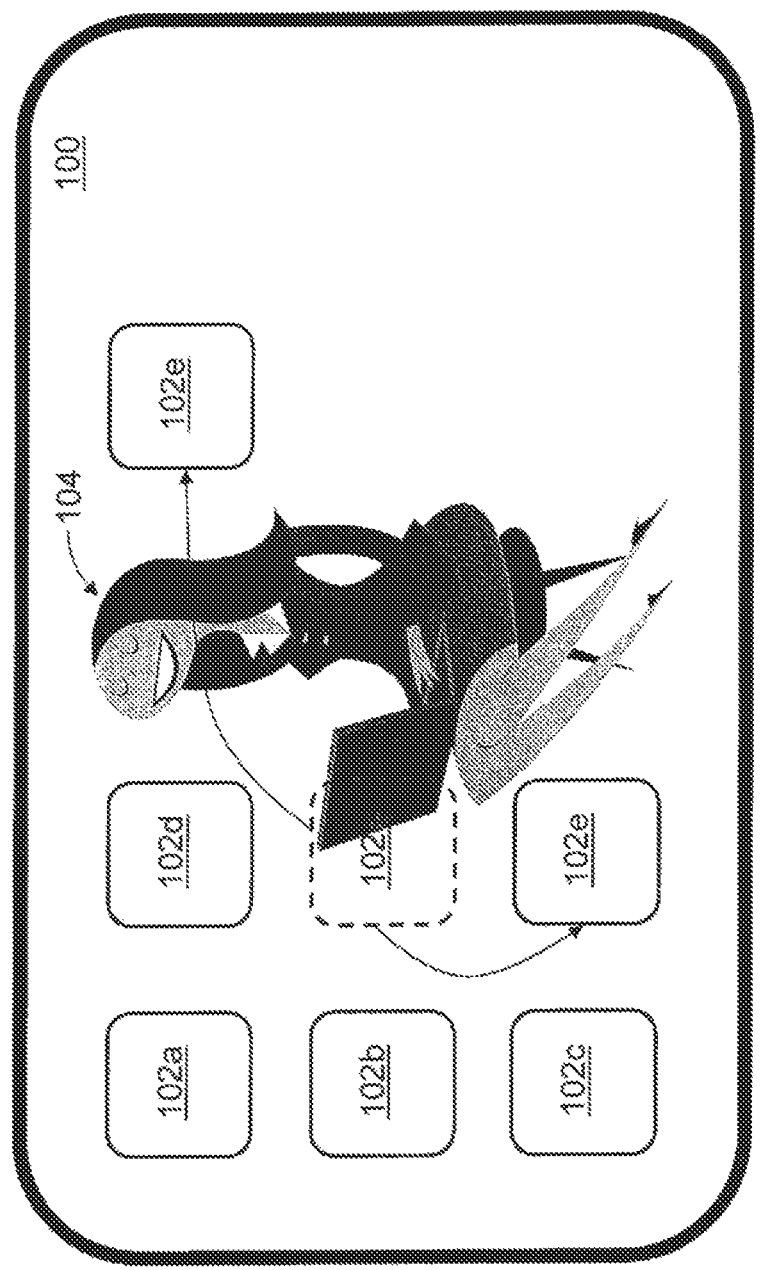

According to aspects of the present disclosure, FIG. 1c shows how the electronic device 100 can place the new icon 102e at a location on the display screen of the electronic device 100 that does not overlap with a meaningful portion of the wallpaper 104. (Actually, FIG. 1c shows two such possible locations, both of them representing unused locations on the logical rectangular grid.)

Note that traditionally, if the new icon 102e were automatically placed at an unfortunate location, then, the user could manually move the icon 102e to a more preferable location on the display screen. While that manual move would resolve the problem for the moment, the problem would arise again for the next new icon or when the user asks the system to sort the icons on the screen (for example, by name alphabetically or by creation date). Aspects of the present disclosure solve this problem once and for all.

Figure 2:
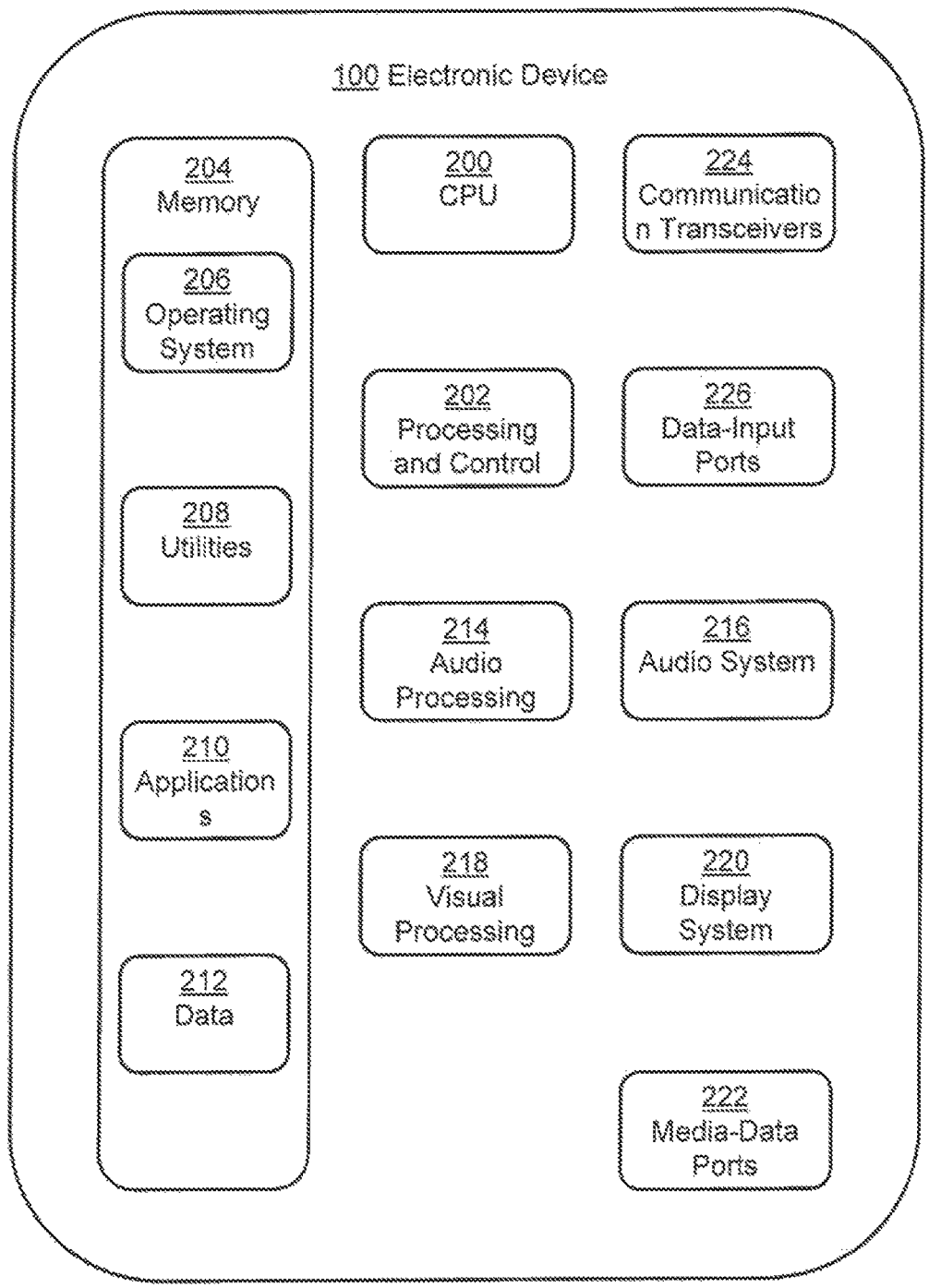
FIG. 2 is a generalized schematic of an electronic device in which the present techniques may be practiced.

FIG. 2 shows the major components of a representative electronic device 100. The device 100 could be a personal electronics device (such as a smart phone, tablet, or personal computer), a set-top box driving a television monitor, or a computer server. It could even be a plurality of servers working together in a coordinated fashion.

Figure 4:
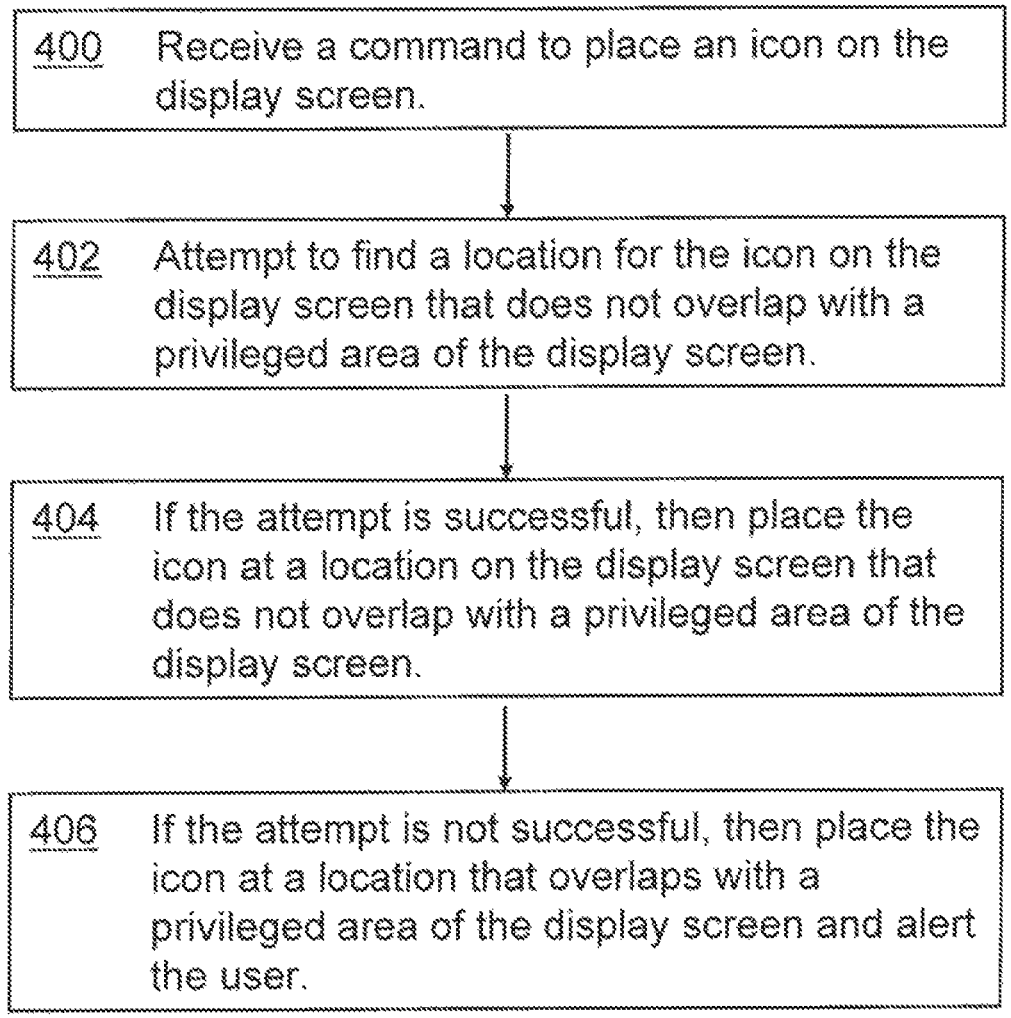
FIG. 4 is a flowchart of a representative method for alerting a user to the fact that an icon is being placed on a privileged area of a display screen.
Figure 5:
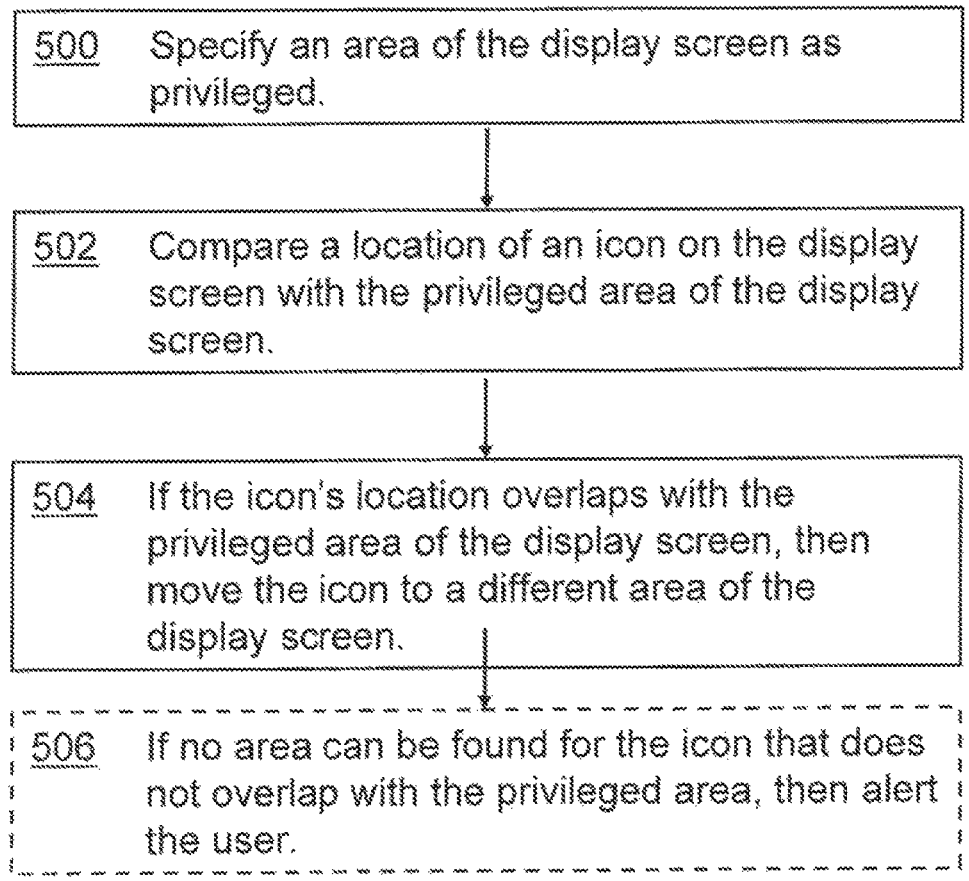
FIG. 5 is a flowchart of a representative method for marking as privileged an area of a display screen.

The CPU 200 of the electronic device 100 includes one or more processors (i.e., any of microprocessors, controllers, and the like) or a processor and memory system which processes computer-executable instructions to control the operation of the device 100. In particular, the CPU 200 supports aspects of the present disclosure as illustrated in FIGS. 3 through 5, discussed below. The device 100 can be implemented with a combination of software, hardware, firmware, and fixed-logic circuitry implemented in connection with processing and control circuits, generally identified at 202. Although not shown, the device 100 can include a system bus or data transfer system that couples the various components within the device 100. A system bus can include any combination of different bus structures, such as a memory bus or memory controller, a peripheral bus, a universal serial bus, and a processor or local bus that utilizes any of a variety of bus architectures.

The electronic device 100 also includes one or more memory devices 204 that enable data storage, examples of which include random-access memory, non-volatile memory (e.g., read-only memory, flash memory, EPROM, and EEPROM), and a disk storage device. A disk storage device may be implemented as any type of magnetic or optical storage device, such as a hard disk drive, a recordable or rewriteable disc, any type of a digital versatile disc, and the like. The device 100 may also include a mass-storage media device.

The memory system 204 provides data-storage mechanisms to store device data 212, other types of information and data, and various device applications 210. As operating system 206 can be maintained as software instructions within the memory 204 and executed by the CPU 200. The device applications 210 may also include a device manager, such as any form of a control application or software application. The utilities 208 may include a signal-processing and control module, code that is native to a particular component of the electronic device 100, a hardware-abstraction layer for a particular component, and so on.

The electronic device 100 can also include an audio-processing system 214 that processes audio data and controls an audio system 216 (which may include, for example, speakers). A visual-processing system 218 processes graphics commands and visual data and controls a display system 220 that can include, for example, a display screen. The audio system 210 and the display system 220 may include any devices that process, display, or otherwise render audio, video, display, or image data. Display data and audio signals can be communicated to an audio component or to a display component via a radio-frequency link, S-video link, High-Definition Multimedia Interface, composite-video link, component-video link, Digital Video Interface, analog audio connection, or other similar communication link, represented by the media-data ports 222. In some implementations, the audio system 216 and the display system 220 are components external to the device 100. Alternatively (e.g., in a cellular telephone), these systems 216, 220 are integrated components of the device 100.

The electronic device 100 can include a communications interface which includes communication transceivers 224 that enable wired or wireless communication. Example transceivers 224 include Wireless Personal Area Network radios compliant with various IEEE 802.15 standards. Wireless Local Area Network radios compliant with any of the various IEEE 802.11 standards. Wireless Wide Area Network cellular radios compliant with 3GPP standards. Wireless Metropolitan Area Network radios compliant with various IEEE 802.16 standards, and wired Local Area Network Ethernet transceivers.

The electronic device 100 may also include one or more data-input ports 226 via which any type of data, media content, or inputs can be received, such as user-selectable inputs (e.g., from a keyboard, from a touch-sensitive input screen, or from another user-input device), messages, music, television content, recorded video content, and any other type of audio, video, or image data received from any content or data source. The data-input ports 226 may include USB ports, coaxial-cable ports, and other serial or parallel connectors (including internal connectors) for flash memory, storage disks, and the like. These data-input ports 226 may be used to couple the device 100 to components, peripherals, or accessories such as microphones and cameras.

FIG. 3 presents a representative method for placing an icon 102e on a display screen 220, according to aspects of the present disclosure. Generally speaking, the method of FIG. 3 can be performed by an operating system 206 of the electronic device 100, by a utility program 208, or even by an application 210.

In step 300, a command is received to plan the icon 102e on the display screen 220 of the electronic device 100. The icon 102e may be newly created, being placed on the display screen 220 for the first time, or may be pre-existing, the command being, for example, to move the icon 102e from one location to another on the display screen 220 or to re-arrange all of the existing icons 102a-e on the display screen 220. The icon 102e can be any visual information and can be created by the operating system 206, a utility program 208, or an application 210.

In the method of FIG. 3, the command to place the icon 102e includes a proposed location for the icon 102e on the display screen 220. As discussed above, the proposed location may be the next unused space in a logical grid. Alternatively, the location can be proposed by a user dragging a pre-existing icon 102e to a new location on the display screen 220. In step 302, that proposed location is compared against one or more "privileged" areas of the display screen 220. (The discussion of FIG. 5, below, presents several method for marking an area of the display screen 220 as privileged. For the present, please assume that these privileged areas have been determined.)

If the proposed location for the icon 102e overlaps with an area marked as privileged on the display screen 220, then if possible, the icon 102e is placed at another location, one that does not overlap with a privileged area (step 304). This is the situation illustrated in FIG. 1c. There, the entire picture of the person is considered to be privileged, so the icon 102e is placed at a location that does not overlap with that picture.

In many cases, there will be numerous locations available for the icon 102e that do not overlap with any privileged areas. It is expected that the system will implement a consistent method for choosing among these available alternatives. For example, and returning to the regular grid mentioned above, the system might always pick the next unused grid location that does not overlap with a privileged area. Such a method has the advantage of consistent behavior when, for example, the user asks the system to re-arrange the icons 102a-e on the screen 220.

In some cases, it may not be possible to place the icon 102e at a location that does not overlap with a privileged area. For example, the icon 102e may be too big (or too oddly shaped), too much of the wallpaper 104 may be considered to be privileged, or there may so many other icons 102a-d already on the display screen 220 that they take up all of the unprivileged areas. In these cases, it is recommended that the icon 102e be placed on the screen 220 in a position that overlaps a privileged area and that the user be alerted to the situation (step 306). It is possible, alternatively, to alert the user without placing the icon 102e anywhere, but that is expected to more confusing and risks the possibility that the icon 102e will be "lost."

FIG. 4 presents a variant on the method of FIG. 3. In step 400, a command is received to place the icon 102e on the display screen 220. However, unlike in the method of FIG. 3, there is no proposed location associated with this command. Thus, the step (302 in FIG. 3) of comparing the proposed location to the display screen's privileged areas does not exist in the method of FIG. 4.

Instead, the method of FIG. 4 proceeds in step 402 (parallel to step 304 of FIG. 3) to try to find a location for the icon 102e that does not overlap with any privileged areas. If the attempt is successful, then the icon 102e is placed in that non-privileged location (step 404). As discussed above with reference to step 304 of FIG. 3, it is expected that, if there are multiple acceptable alternative locations for the icon 102e, then the system will apply a consistent method to choose among the alternatives.

If no non-privileged location is found in step 404, then the method of FIG. 4 continues, in step 406 (parallel to step 306 of FIG. 3), to place the icon 102e in a less than ideal location and to alert the user.

FIG. 5 presents a few techniques for "privileging" an area of the display screen 220.

In step 500, the area to be privileged is specified. There are numerous possibilities for doing this. As a first example, the wallpaper image 104 can be fed into image-recognition software. The software can look for faces, text, and other features. When such a feature is found, the software marks an area surrounding the feature as privileged (or as potentially privileged, subject to approval by the user.) In the example of FIG. 1a, the software may find the face of the person depicted and mark the location of the face as privileged.

As a second example, the user can run a utility that allows him to directly specify areas to be privileged. This is especially useful when the user wishes to privilege an area not easily found by image-recognition software. Again using the example of FIG. 1a, the user may wish to specify the entire picture as privileged (rather than just the face). In another example, the privileged area may be a sunset or an especially pretty flower. Here, the user can select the area by using a tracking device to delineate a rectangle or other closed figure surrounding the area of interest.

It should be noted that, for purposes of the present discussion, an area is "privileged" based on its absolute position on the display screen 220 (or, usually equivalently, on its absolute position on the wallpaper 104). That is to say, an area is not considered to be "privileged" simply because another icon is already in that location. Nor is an area considered to be "privileged" because the operating system has dedicated that portion of the display 220 for presenting, for example, a tool bar. Generally speaking, traditional systems already know not to place the new icon 102e on top of an existing icon or on the toolbar, so there is no need to mark these areas as privileged.

Some systems now accept "dynamic wallpaper," which can be, effectively, a video (or slideshow) running behind the icons 102a-e on the display screen 220. While the techniques of the present invention can be applied to this situation (e.g., by continually running face-recognition software and then moving the icons 102a-e around to avoid covering the faces in the wallpaper video), care must be taken to avoid confusing the user. It may be best, in this situation, to leave the icons 102a-e in fixed locations, even if they occasionally obscure meaningful portions of the wallpaper video.

For completeness sake, the method of FIG. 5 continues after the privileged areas have been specified. The newly privileged areas are compared against the locations of existing icons 102a-e (step 502), and those icons 102a-e are moved, if necessary, to non-privileged locations (step 504). If no such move is possible, then the user is alerted in step 50. He may decide to respond by shrinking the newly privileged area.

In the above discussion, areas of the display screen 220 are either privileged or not privileged. This simple dualism can be extended to levels of privilege, wherein the least privileged (including non-privileged) areas are occupied first by icons, then the somewhat more privileged, and then the most privileged only as a last resort.

In view of the many possible embodiments to which the principles of the present discussion may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

We claim:

1. A method comprising:
   applying, by an electronic device, image recognition to a first image displayed by an electronic wallpaper on a display screen;
   identifying, based on image recognition, an object in the first image;
   marking a portion of the display screen corresponding to the object as a first privileged area;
   receiving, by the electronic device, a command to place an icon on the display screen at a proposed location on the display screen;
   determining that the proposed location of the icon overlaps the first privileged area and that a different location does not overlap the first privileged area and is available for placement of the icon:
   placing, by the electronic device based on the determining, the icon at the different location on the display screen;
   determining that the electronic wallpaper changed the first image to a second image, and that the second image includes an object corresponding to a second privileged area and overlapping the different location;
   automatically determining, based on determining that the electronic wallpaper changed the first image to the second image, a second location on the display screen for the icon that does not overlap the second location and the second privileged area; and
   automatically moving the icon at the second location when the second image is displayed.

2. The method of claim 1 wherein the command to place an icon is initiated by an element selected from the group consisting of: a user of the electronic device, an operating system of the electronic device, and an application running on the electronic device.

3. The method of claim 1 wherein the command to place an icon is selected from the group consisting of: move an existing icon, re-arrange existing icons, and create a new icon.

4. The method of claim 1 wherein the proposed location of the icon is generated by an element selected from the group consisting of: a user of the electronic device, an operating system of the electronic device, and an application running on the electronic device.

5. The method of claim 1 further comprising:
if the proposed location of the icon overlaps the first privileged area and if no location of the icon is found that does not overlap the first privileged area, then:
placing the icon at the proposed location on the display screen; and
generating an alert.

6. The method of claim 5 wherein the alert alerts a user of the electronic device that no location was found for the icon that does not overlap the first privileged area of the display screen.

7. An electronic device, comprising:
a display device operable to display a display screen; and
a processor operatively connected to the display device and configured to execute instructions that cause the electronic device to perform operations comprising:
applying image recognition to a first image displayed by an electronic wallpaper on the display screen;
identifying, based on the image recognition, an object in the first image;
marking a portion of the display screen corresponding to the object as a first privileged area;
receiving a command to place an icon on the display screen at a proposed location on the display screen;
determining that the proposed location of the icon overlaps the first privileged area and that a different location does not overlap the first privileged area and is available for placement of the icon:
placing, based on the determining, the icon at the different location on the display screen;
determining that the electronic wallpaper changed the first image to a second image, and that the second image includes an object corresponding to a second privileged area and overlapping the different location;
automatically determining, based on determining that the electronic wallpaper changed the first image to the second image, a second location on the display screen for the icon that does not overlap the second location and the second privileged area; and
automatically moving the icon at the second location when the second image is displayed.

8. The electronic device of claim 7 wherein the electronic device is selected from the group consisting of: a personal electronics device, a mobile telephone, a personal digital assistant, a tablet computer, a personal computer, a set-top box, a computer server, and a coordinated group of computer servers.

9. In an electronic device, a method comprising:
receiving, by the electronic device, a command to place an icon on a display screen at a first location corresponding to a first privileged area, the first privilege area being associated with a currently displayed first image;
determining that a second location does not overlap the first privileged area and is available for placement of the icon;
placing, based on receiving the command and determining that the second location does not overlap the first privileged area, the icon at the different location on the display screen;
determining that the currently displayed first image changed to a second image;
determining, in response to the first image changing to the second image, a second privileged area associated with the second image;
determining that the icon was not overlapping the first privileged area but now overlaps the second privileged area;
attempting, by the electronic device, to find a location for the icon on the display screen that does not overlap with second privileged area; and
if the attempt is successful, then:
placing, by the electronic device, the icon at the non-overlapping location on the display screen;
else:
placing, by the electronic device, the icon at an overlapping location on the display screen; and
generating, by the electronic device, an alert.

10. The method of claim 9 wherein the command to place an icon is initiated by an element selected from the group consisting of: a user of the electronic device, an operating system of the electronic device, and an application running on the electronic device.

11. The method of claim 9 wherein the command to place an icon is selected from the group consisting of: move an existing icon, re-arrange existing icons, and create a new icon.

12. The method of claim 9 wherein the alert alerts a user of the electronic device that no location was found for the icon that does not overlap the second privileged area of the display screen.

13. An electronic device comprising:
a display device operable to display a display screen, the display screen comprising a first privileged area associated with a currently displayed first image; and
a processor operatively connected to the display device and configured to execute instructions that cause the electronic device to perform operations comprising:
determining that the currently displayed first image changed to a second image;
automatically identifying, in response to determining that the first image changed to a second image, a second privilege area of the display screen associated with the second image;
identifying an icon, displayed on the display screen, that was not overlapping the first privileged area but now overlaps the second privileged area;
attempting, in response to identifying the icon, to find a location for the icon on the display screen that does not overlap with the second privileged area of the display screen; and
if the attempt is successful, then:
placing the icon at the non-overlapping location on the display screen;
else:
placing the icon at an overlapping location on the display screen; and
generating an alert.

14. The electronic device of claim 13 wherein the electronic device is selected from the group consisting of: a personal electronics device, a mobile telephone, a personal digital assistant, a tablet computer, a personal computer, a set-top box, a computer server, and a coordinated group of computer servers.

15. In an electronic device displaying a display screen, a method comprising:
specifying, by the electronic device, a first area of the display screen as privileged, the first area being associated with a first image displayed on the display screen;
receiving an instruction to place an icon at a first location of the display screen overlapping the first area;

moving, by the electronic device, the icon from the first location to a second location on the display screen that does not overlap the first area;

determining, after the moving, that a second image is displayed on the display screen;

automatically determining, in response to determining that the second image is displayed, that a second area of the display screen as privileged; and automatically, in response to determining that the second image is displayed, moving the icon from the second location to a third location that does not overlap the second area.

16. The method of claim 15, wherein the first image and the second image are automatically displayed by an electronic wallpaper, wherein step of determining that a second area of the display screen in privileged comprises:

applying image recognition to the electronic wallpaper; and specifying as privileged an area containing an object found in the electronic wallpaper.

17. The method of claim 16 wherein the object found comprises an image of a face.

18. The method of claim 15, wherein the first image and the second image are automatically displayed by an electronic wallpaper, wherein step of determining that a second area of the display screen in privileged comprises:

applying text recognition to the electronic wallpaper; and specifying as privileged an area containing text found in the electronic wallpaper.

19. The method of claim 15 wherein specifying comprises:

specifying as privileged an area selected by a user of the electronic device.

20. The method of claim 15 further comprising:

if the second location of the icon overlaps the second area and if no third location of the icon is found that does not overlap the second area, then:

generating an alert.

21. The method of claim 20 wherein the alert alerts a user of the electronic device that no location was found for the icon that does not overlap the second area of the display screen.

22. An electronic device, the comprising:

a display device operable to display a display screen;

a processor operatively connected to the display device and configured to execute instructions that cause the electronic device to perform operations comprising:

specifying a first area of the display screen as privileged, the first area being associated with a first image displayed on the display screen;

receiving an instruction to place an icon at a first location of the display screen overlapping the first area;

moving the icon from the first location to a second location on the display screen that does not overlap the first area;

determining, after the moving, that a second image is displayed on the display screen;

automatically determining, in response to determining that the second image is displayed, that a second area of the display screen as privileged; and automatically, in response to determining that the second image is displayed, moving the icon from the second location to a third location that does not overlap the second area.

23. The electronic device of claim 22 wherein the electronic device is selected from the group consisting of: a personal electronics device, a mobile telephone, a personal digital assistant, a tablet computer, a personal computer, a set-top box, a computer server, and a coordinated group of computer servers.

* * * * *